United States Patent [19]

Barton et al.

[11] 4,160,547
[45] Jul. 10, 1979

[54] DOCUMENT HANDLING APPARATUS

[75] Inventors: Peter Barton, Sling near Coleford; Philip W. J. Lamb, Herom Estate, both of England

[73] Assignee: Xerox Corporation, Stamford, Conn.

[21] Appl. No.: 780,894

[22] Filed: Mar. 24, 1977

[30] Foreign Application Priority Data

Jun. 25, 1976 [GB] United Kingdom ............... 26584/76

[51] Int. Cl.$^2$ .............................................. B65H 5/02
[52] U.S. Cl. .................................. 271/275; 15/256.5; 74/230; 198/497; 271/198
[58] Field of Search ........................ 271/275, 198–203; 198/497, 499; 74/230; 15/256.5

[56] References Cited

U.S. PATENT DOCUMENTS

| 2,885,069 | 5/1959 | Bowen | 198/497 X |
| 3,267,970 | 8/1966 | Maquire | 198/497 X |
| 3,510,903 | 5/1970 | Stoever | 15/256.5 |
| 3,523,319 | 8/1970 | Stoever | 15/256.5 X |
| 3,683,445 | 8/1972 | Hagadorn | 15/256.5 X |
| 3,994,385 | 11/1976 | Reiter | 198/499 |

Primary Examiner—Richard A. Schacher

[57] ABSTRACT

A document handling apparatus by which documents are engaged and conveyed is disclosed. The apparatus includes a document-transport belt for engaging a document on a document-receiving surface and means for driving the belt to convey a said document across the surface. A document hitch supports the document intermediate document engaging zones thereof spaced apart in the direction of travel of the belt. The hitch comprises a base portion defining a surface supporting the belt and sidewalls for guiding the belt, the base portion having a transversely extending channel in the belt-support surface defining at least one cleaning edge for cleaning the surface of the belt passing thereover.

14 Claims, 5 Drawing Figures

DOCUMENT HANDLING APPARATUS

BACKGROUND OF THE DISCLOSURE

I. Field of the Invention

This invention relates to document handling apparatus, particularly for use in copying machines. More particularly, the invention is concerned with such apparatus including a belt by which documents are engaged and conveyed and a belt hitch for supporting the belt.

II. Description of the Prior Art

Document handlers are used in photocopiers to feed a document to be copied, usually from a stack of such documents, to an exposure platen where it is registered. The document is held in position on the platen until the required number of copies have been made, and then moved to an output collection point for subsequent removal, e.g., by the machine operator. As the document is moved off the platen, another document may be fed from the stack into position for copying, and so on. The document handling apparatus should provide a convenient and reliable means of maximizing the copying capacity of the copier as well as improving the efficiency of the copier.

In such document handlers the document is conveniently conveyed over the platen by means of a belt, usually endless, which engages the document and slides it across the platen which is generally of glass. Once the document has been registered on the platen, the belt should slip on the surface of the document sandwiched between it and the platen. We have found that improved document handling may be achieved by reducing the contact area of the belt with the document. For this purpose we have proposed in our copending Application Ser. No. 687,062, filed May 17, 1976 and assigned to the same assignee as the present invention that a hitch be provided in the belt to support it out of contact with the document between document engaging zones adjacent the input and output ends of the platen.

The belt is conveniently provided in a platen cover which may be retracted to provide access to the platen, e.g., for manual insertion and removal of documents. Thus, another advantage of a belt hitch as proposed above is to support the belt and prevent it from sagging when the platen cover is lifted away from the platen.

SUMMARY OF THE INVENTION

It is one object of this invention to provide, in a document handling apparatus including a document-transport belt for engaging a document on a document-receiving surface and means for driving the belt to convey a said document across the surface; a document hitch supporting the document intermediate document engaging zones thereof spaced apart in the direction of travel of the belt.

Dirt collected by the belt manifests itself as a problem in several ways. Apart from being generally undesirable, dirt may affect the friction characteristics of the drive surface of the belt and may offset onto the backs of documents. Further, in the case of a platen transport belt, where a document to be copied is smaller than the copy paper being used, the belt itself may form a background to the image being reproduced. Dirt on the belt may well, in such circumstances, be reproduced on the copy.

From one aspect, the invention consists in that the hitch comprises a base portion defining a surface supporting the belt and side walls for guiding the belt, the base portion having a transversely extending channel in the belt-support surface defining at least one cleaning edge for cleaning the surface of the belt passing thereover.

In the same way that a platen transport belt may form part of the background to an image to be reproduced, so also may a hitch member supporting the belt. In order to avoid the hitch from being 'seen' by the copier and reproduced on the copy, the invention consists, from another aspect, in that the hitch comprises a base portion defining a surface supporting the belt, the base portion being configured and coloured to conform and merge with the belt supported by the hitch.

In a preferred form the belt support surface has a smoothly curved convex profile and the underside of the base portion is planar.

From a further aspect, the invention consists in a photocopier incorporating one or more of the features of the document handling apparatus described above.

It is another and separate object of this invention to provide a belt hitch for a document driving belt of a document handler and from a still further aspect, the invention consists in a hitch for a document driving belt of a document handler comprising a base portion defining a surface for supporting the belt and side walls for guiding the belt and forming with the base portion a generally channel-shaped member, said base portion having a transversely extending channel in the belt-support surface defining at least one cleaning edge for cleaning the surface of a belt passed thereover.

BRIEF DESCRIPTION OF THE DRAWINGS

In order that the invention may be more readily understood, reference will now be made to the accompanying drawings, in which.

DESCRIPTION OF THE PREFERRED EMBODIMENTS

Figure 1:
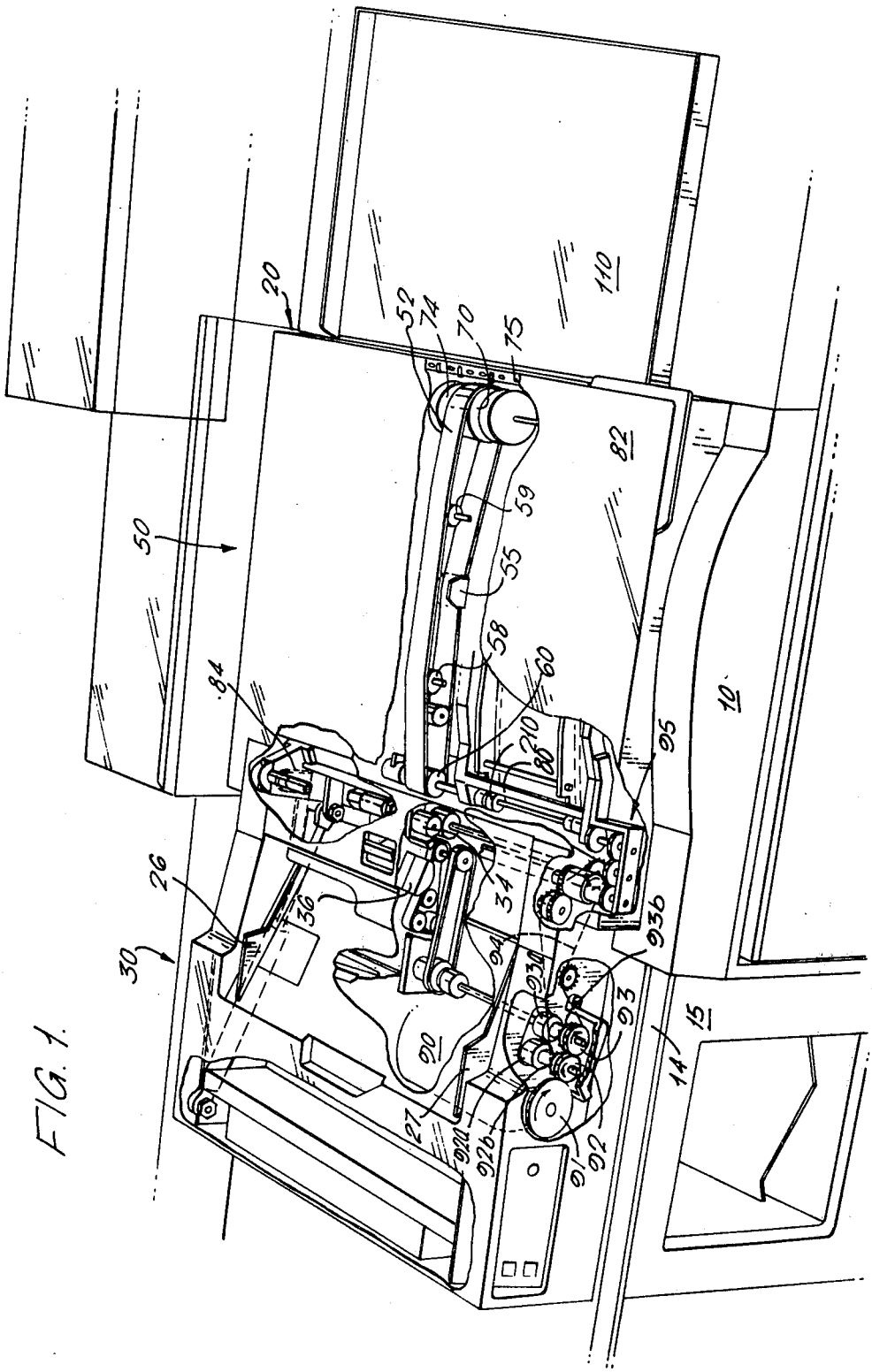
FIG. 1 is a perspective view of a document handling apparatus in position on an electrostatographic copier with parts of the apparatus broken away to show greater detail.
Figure 2:
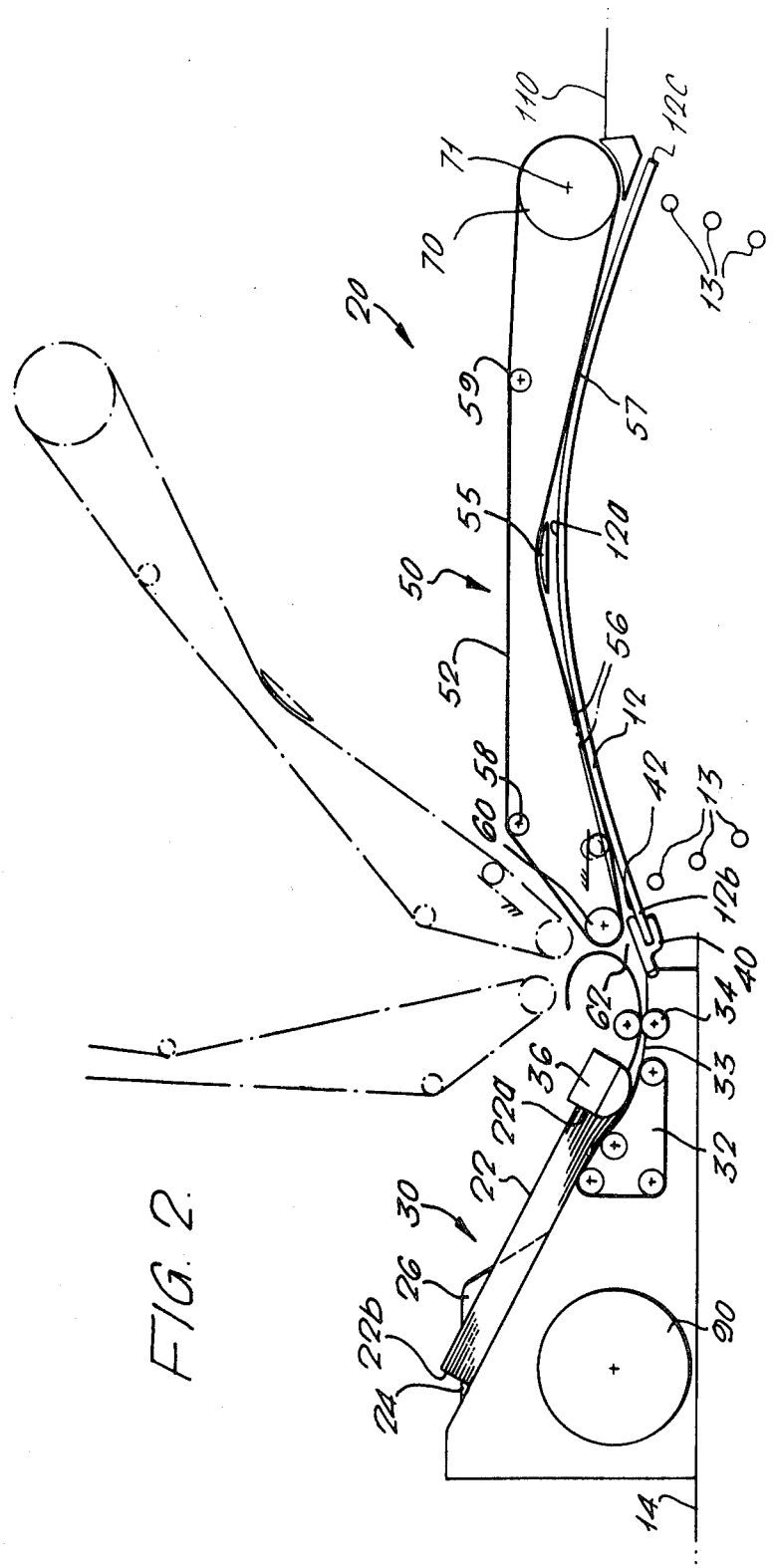
FIG. 2 is a schematic cross-sectional view of the apparatus of FIG. 1.

Referring to FIGS. 1 and 2 of the drawings there is shown a portion of an automatic electrostatic reproduction machine 10 of the kind disclosed for example in U.S. Pat. No. 3,301,126 including a document handling apparatus 20 in accordance with the invention. The document handler 20 overlies a work station comprising an exposure area or platen 12 of the machine 10 and extends over an upper suface 14 of a document output or sorter extension 15 of the machine. The document handler 20 is synchronized with the control of the machine 10 automatically to feed seriatim documents to be copied to the platen 12, register each document and hold it in position on the platen until a selected number of copies has been produced by the machine 10 and then remove it from the platen while feeding the next document to be copied. One method of producing the copies by the machine 10 will be understood for example by reference to the above mentioned U.S. Pat. No.

3,301,126 from which it will be seen that the platen 12 is illuminated from below as suggested by the lamps 13 in FIG. 2 and the image on an upper surface 12a of the platen reflected on to a photoconductive surface (not shown) where the image is developed and from which it is transferred to a suitable substrate to produce the copy.

Document handler 20 generally comprises a sheet material feeder 30 and a document transport 50. The feeder 30 includes a supply tray 24 for cut-sheet documents, and a sheet separator mechanism 32 and a pair of advancing or pinch rolls 34 by which the documents are fed one at a time from a stack of documents in the tray 24 to the document transport 50.

For specific details of an embodiment of a sheet separator 32 which has been found to perform particularly well in this environment reference may be made to copending U.S. Application Ser. No. 687,058, filed on May 17, 1976 and assigned to the same assignee as the present application.

In operation, documents 22 which may be ordinary cut sheets of paper having generally parallel and straight forward and rear edges 22a, 22b respectively, are placed face down for copying in the inclined tray 24 so that the forward edge 22a of the documents will be held normal to the direction of document travel by a suitable restraining member 36.

The alignment of documents by the document feeder 30 relative to the exposure station 12 is preferably such that the center line of the documents remains at generally the same position regardless of the width of the document. This alignment is provided in this embodiment by a pair of self-centering side guides 26 and 27 on opposite sides of the supply tray 24 which restrain the side edges of the documents generally parallel to the direction of feed and feed documents from a central area of the stack or pile regardless of the width of the stack.

With the documents in place and the processor 10 set to make the required number of copies of each document 22, automatic operation is initiated by activation of the "start-print" control of the processor 10.

From its position on the bottom of the document pile in tray 24 the first document is separated from the remainder of the stack by the separator 32 and fed forward over a guide 33 so that its forward edge 22a enters the nip of the driven pinch rolls 34 which latter pull the document 22 completely from the tray and move its forward edge 22a over a registration member 40 and under the control of the transport 50.

The document transport 50 comprises an endless belt 52 riding over and extending between rollers 60 and 70. The belt 52 is driven via the roller 60 which may be rotated in two directions. Anti-clockwise rotation of roller 60 drives the belt "forwards" to advance a document across the platen 12. Clockwise rotation "reverses" the belt for registering the rear edge of a document against the registration member 40. The rollers 60 and 70 rotate on shafts 61 and 71 respectively which are mounted on a movable frame 80 located centrally along opposite sides 12b and 12c of the platen upper surface 12a so that the belt entrained thereover extends across the central portion of the platen or processing station 12. The belt itself is narrow relative to the platen as proposed in copending U.S. Application Ser. No. 687,062, filed May 17, 1976 (allowed) and assigned to the same assignee as the present application. The frame 80 supports a suitable outer cover 82 which hides the moving parts and prevents light from entering the platen 12.

Advantageously the roller 60 is of small diameter (e.g., 1.5 inches) so that a nip 62 between the belt 52 entrained thereover and the platen surface 12a may be as close as necessary to the edge 12b of the platen and to the paper feeder 30. The belt 52 rests on the platen surface 12a and is made of a material such as silicon rubber on a flexible backing and is preferably white on its outer surface and has a high coefficient of friction with paper type materials, e.g., 0.9. The platen surface 12a will usually be smooth glass so that its coefficient of friction with the paper or belt is relatively low e.g., less than 0.4. Consequently, a document in the form of a material with a relatively high coefficient of friction such as paper for example, will be effectively gripped by the belt 52 on its upper side when it is fed into the nip 62 and caused to slide over the surface 12a on its lower side under the control of the belt 52.

A schematic illustration of how the transport 50 moves out of position to allow access to the platen area 12 for manual use or cleaning is set forth by the dotted lines in FIG. 2 which show the mechanism in a generally half open position and also in a fully open position. As may be understood from FIG. 1 the frame means 80 pivots about an axis 84 that is spaced above the platen 12 to allow full opening extending the frame 80 upwardly about ninety degrees.

According to the present invention a hitch 55 from the belt 52 is positioned on the outside of the belt 52 to support the belt above the platen 12 at an intermediate point between the rollers 60, 70 so that the belt contacts the platen surface 12 at two separated contact areas 56, 57 spaced along its length, i.e., in the direction of travel of the belt. Preferably, as shown, the intermediate point is generally halfway between the rollers.

Figure 3:
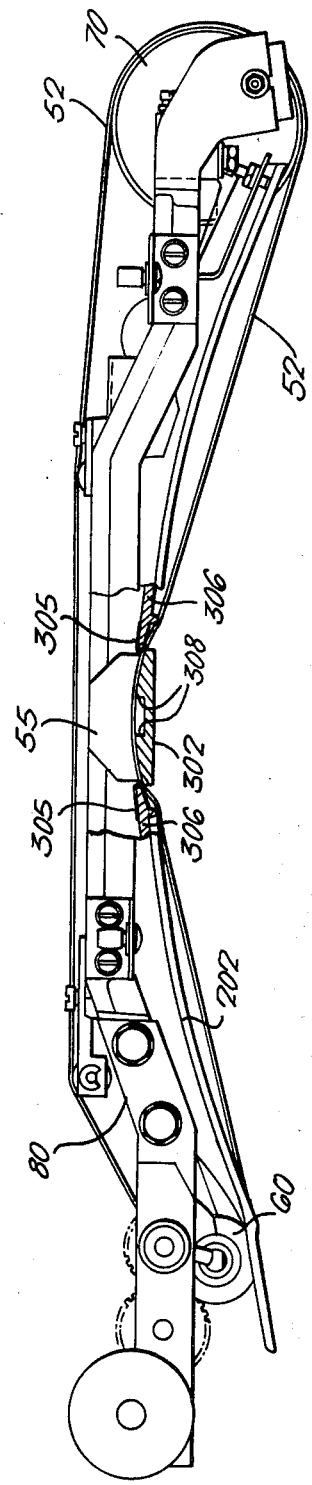
FIG. 3 is a section through the platen cover of the apparatus shown in FIG. 1 and showing a belt hitch in accordance with this invention.
Figure 5:
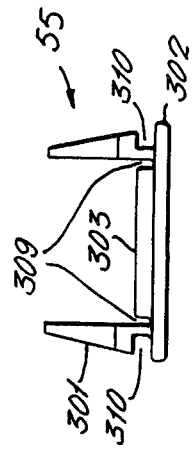
FIG. 5 is an end view of the belt hitch.
Figure 4:
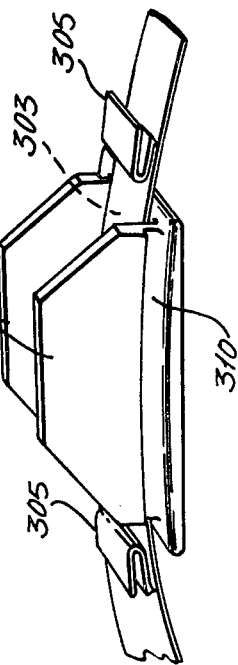
FIG. 4 is a perspective view of the belt hitch shown in FIG. 3.

As shown in FIGS. 3, 4 and 5, hitch 55 comprises a base portion 302 and opposite side walls 301 that form a channel for passage of belt 303 therethrough. Side walls 301 have longitudinal depressions 310 that allow for snap fit into a support member. Side edges of belt 303 are spaced from adjacent walls 301 by longitudinal passages 309. Guide elements 305 supported by members 306 are arranged adjacent the hitch 55 to urge the belt against belt-support surface or base member 302. The guide members are provided adjacent the leading and trailing edges, respectively, of the hitch. Base portion 302 has a centrally located transversely extending channel with side walls 308 that define cleaning edges for cleaning the surface of belt 303 as it passes thereover. The cleaning edges include sharp corners that deform and scrape the belt as it passes thereover to remove any undesired material or matter such as dirt. Support member 302 has a smooth convex profile that supports belt 303. The underside of the support member or base portion is planar.

Idler rollers such as shown at 58, 59 may be provided as required at other positions along the length of the belt means 52. These may be positioned to adjust belt tension.

Further details of hitch 55 are given in our copending U.S. Application Ser. No. 687,062, filed May 17, 1976 and assigned to the same assignee as the present application.

Registration member 40 functions to align documents in a predetermined relationship and extends along platen edge 12b. Member 40 is arranged so that documents being fed toward the platen 12 in a first direction pass smoothly thereover; however, it includes an edge 42 raised above the surface 12a so that once a document has passed thereover and is moved in reverse direction, a trailing edge 22b of the document held against the surface 12a will abut thereagainst. Registration member 40 is preferably in the form of a generally channel-shaped plastics clip which fits over the edge of the platen glass 12. A baffle member 202 may be provided, as set out in copending Application Ser. No. 687,059, filed May 17, 1976 and assigned to the same assignee as the present application, to assure proper abutment of the document edge against the registration surface 42. As is known from U.K. Pat. No. 1,122,626 suitable indicia may be provided on the registration member to allow manual alignment of documents when the machine is being used in a manual mode.

By using a narrow belt 52 with crowned rollers 60, 70 construction is greatly simplified in that no side guides are required and tracking problems are greatly reduced compared with a wide belt. We have found that a narrow belt of greater than a 35-1 length to width ratio tracks very well without any guides and does not tend to cause the document to skew.

Operating the belt 52 in a stable condition on crowned pulleys or rollers 60, 70 without edge guides eliminates belt edge wear and possible detracking which may occur under unstable conditions. Accordingly, maintenance is minimized. The roller 60 may advantageously be rubber tyred to improve traction.

Ejection of documents from the platen 12 is initiated by the belt 52. However, the final push on to an output tray 110 is assisted by a pair of ejection rollers 74, 75 which are coaxial with the second roller 70. The pair of ejection rollers avoid skewing the document during ejection to provide a neat readily collectable output.

As will be understood from the foregoing, a document on the platen is ejected during a forward motion of the belt 52 which also serves to feed the next document onto the platen. Reversal of the belt drive is used to effect registration of this next document. If, however, as may sometimes happen, e.g., due to high humidity conditions, the previous document has not been fully ejected it will be fed back onto the platen during belt reversal and may interfere with the copying process. In order to avoid this happening, the eject rollers 74, 75 can only rotate in the eject direction. For this purpose the rollers 74, 75 are driven off the roller 70 through a one-way drive mechanisms such as sprags or "fiber-trans" clutches. By preventing reverse rotation of the rollers 74, 75 the rollers act, during belt reversal, to prevent reverse movement of the document beneath them by reason of their frictional engagement with the document. For this purpose the rollers 74, 75 preferably have tyres of rubber or other friction material. Further, the rollers 74, 75 are suitably of slightly greater diameter than the belt roller 70 plus the belt 52, so as to increase slightly the velocity of the document during ejection.

Power to drive the paper feeder 30 and the belt transport 50 is supplied by a motor 90 which may advantageously be located under the document tray 24. Rotary motion is transmitted from the motor drive gear 91 to a pair of counter rotating gears 92, 93 which in turn are each connected via clutches 92a, 93a to chain drive sprockets 92b, 93b respectively whereby alternate engagement of the clutches will transmit counter-clockwise or clockwise rotation respectively to a chain drive 94. A clutch surface between the gears 92, 93 and sprockets 92b, 93b, is engaged or disengaged by a clutch which is electrically energized in response to machine control logic. The chain drive 94 in turn causes the pinch rolls to drive intermittently and a series of interconnected gears generally indicated at 95 alternately to drive axis 61 and the first roller 60 in opposite first and second directions.

In operation, as the sheet feeder 30 begins to separate and feed a document 22, the platen baffle 202 is raised to open a document entrance gap below it and above the registration member 40 so that documents advanced by the pinch rolls 34 will enter the gap. When the pinch rolls 34 pass the forward or leading edge 22a of a document toward the nip 62 of the document transport 50 a sensing switch located between them is tripped which causes a trailing edge 22b of the document to be detected after which by a smal delay the baffle 202 is caused to close against member 40 and the belt 52 is caused to reverse to the second direction. The reverse movement of the belt is timed to allow the trailing edge to abut the registration surface 42 and cause the belt 52 to slip over it briefly to assure full registration and correction of any skew.

Closure of the baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off the copy will not, in most cases of 1:1 copying onto document sized paper, include all of the original document. Even where document margins are such that essential information would not be lost as a result of misregistration nevertheless the aesthetics and integrity of copy would be severly reduced in the eyes of a reader.

After the document has been registered the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

Although a preferred embodiment of the invention has been described it will be understood that various modifications may be made without departing from the scope of the claims. For example, two or more parallel narrow belts may be used in place of the single belt described.

While the preferred embodiment described has included a curved platen it will be understood that a flat platen or other processing station configuration may be used instead. Moreover, it will be understood that the terms—"platen" and "exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

We claim:

1. In a document handling apparatus including a document-transport belt for engaging a document on a document-receiving surface and means for driving the belt to convey a said document across the surface; a document hitch supporting the belt intermediate document engaging zones thereof spaced apart in the direction of travel of the belt; said hitch comprising a base portion defining a surface supporting the belt and sidewalls for guiding the belt, the base portion having a transversely extending channel in the belt-support surface defining at least one cleaning edge, said cleaning edge including a sharp corner that deforms the belt whereby as the belt passes over said edge it is scraped clean of undesired materials; wherein said hitch member comprises a moulding of plastics material; wherein said sidewalls of said hitch member include longitudinal depressions to permit said member to be received as a snap fit to insert said member in a support.

2. Apparatus according to claim 1 wherein the belt-support surface of the hitch has a smoothly curved convex profile.

3. Apparatus according to claim 1 wherein the belt support surface of the base portion has a smoothly curved convex profile and the underside of the base portion is planar.

4. Apparatus according to claim 1 wherein said channel is arranged generally centrally of said surface.

5. Apparatus according to claim 4, wherein said channel defines two said cleaning edges.

6. Apparatus according to claim 1 wherein each side edge of the belt support surface is spaced from the adjacent side wall of the hitch member by a longitudinal channel.

7. Apparatus according to claim 1 wherein at least one guide element is arranged adjacent the hitch member to urge the belt against the belt support surface hereof.

8. Apparatus according to claim 7 wherein two said guide elements are provided adjacent the leading and trailing edges respectively of the hitch.

9. A hitch for the driving belt of a document handler, comprising a base portion defining a surface for supporting the belt and sidewalls for guiding the belt and forming with the base portion a generally channel-shaped member, said base portion having a transversely extending channel in the belt-support surface defining at least one cleaning edge, said cleaning edge including a sharp corner that deforms the belt whereby as the belt passes over said edge it is scraped clean of any undesired material; wherein said hitch comprises a moulding of plastics material; wherein said sidewalls include longitudinal depressions to permit said member to be received as a snap fit to insert said hitch member in a support.

10. A hitch according to claim 9 wherein the belt support surface has a smoothly curved convex profile.

11. A hitch according to claim 10 wherein the underside of said base portion is planar.

12. A hitch according to claim 9 wherein said channel is arranged generally centrally of said surface.

13. A hitch according to claim 12 wherein said channel defines two cleaning edges.

14. A hitch according to claim 9 wherein each side edge of the belt support surface is spaced from the adjacent sidewall by a longitudinal channel.

* * * * *